Oct. 30, 1923.  P. A. WEIGEL  1,472,345
FLEXIBLE BUMPER MEANS FOR AUTOMOBILES
Filed Jan. 6, 1922
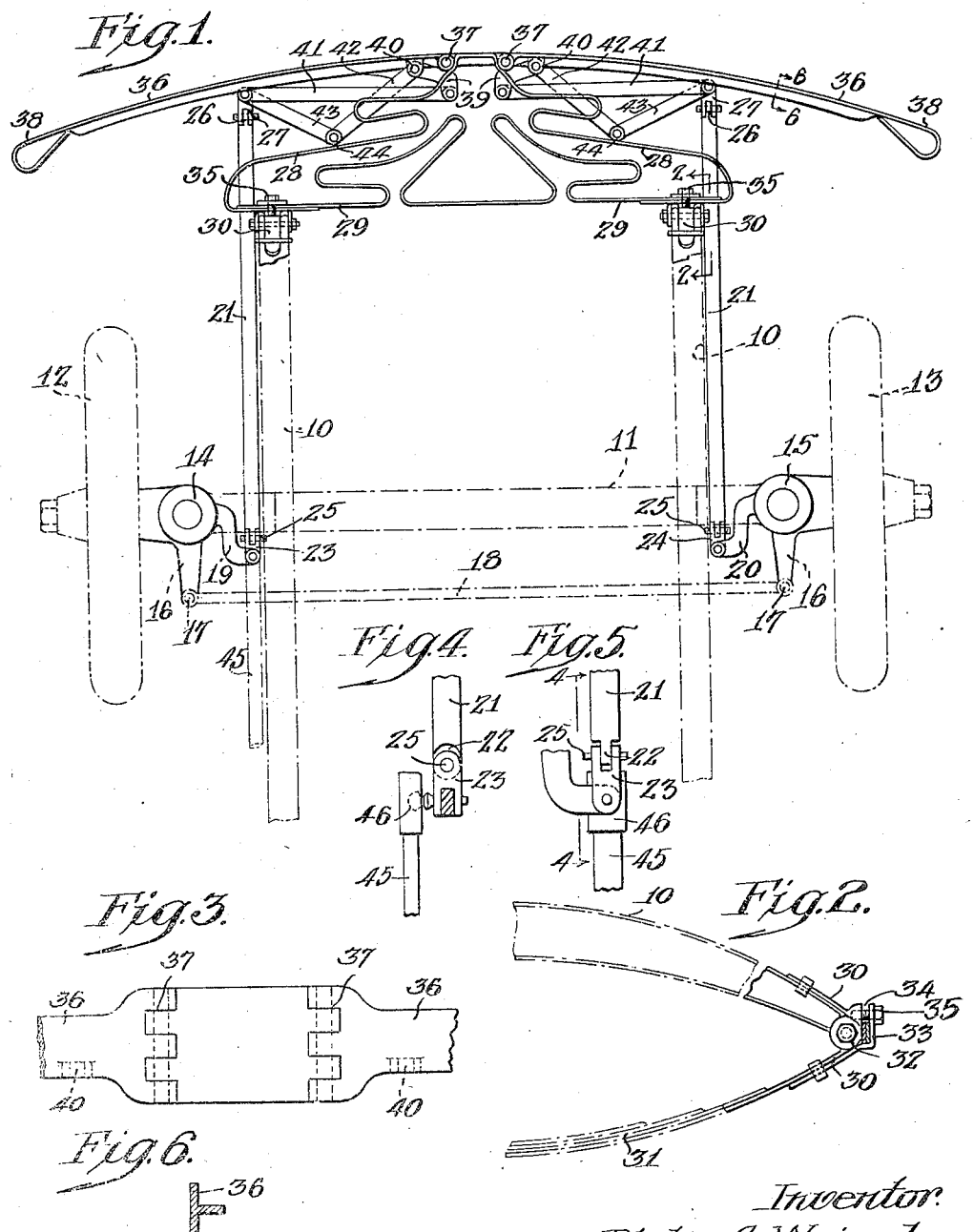
Witness:
Walter Chism
Inventor:
Philip A. Weigel.
by M. Van Boskirk
his Attorney.

Patented Oct. 30, 1923.

1,472,345

UNITED STATES PATENT OFFICE.

PHILIP A. WEIGEL, OF RIVERTON, NEW JERSEY.

FLEXIBLE BUMPER MEANS FOR AUTOMOBILES.

Application filed January 6, 1922. Serial No. 527,334.

*To all whom it may concern:*

Be it known that I, PHILIP A. WEIGEL, a citizen of the United States, residing at Riverton, in the county of Burlington and State of New Jersey, have invented certain new and useful Improvements in Flexible Bumper Means for Automobiles, of which the following is a specification.

This invention relates to flexible bumper means for automobiles.

The primary object of the invention is to provide bumper means as aforesaid, in conjunction with a shock-absorbing stabilizing device as described and illustrated in my application for Letters Patent of the United States, filed December 6th, 1921, Serial No. 520,205, comprising multiple spring loops secured to the automobile frame, duplicate transverse bumper arms hinged centrally to the outer spring loop and duplicate longitudinal moveable bumper rods, actuated by said hinged arms, and connected with the front axle of the automobile, whereby when an obstacle is encountered by said bumper arms, the front wheels will be caused to move away from said obstacle.

This object and other advantageous ends I attain by means of the mechanism hereinafter described, reference to be had to the accompanying drawings, in which:—

Figure 1 is a plan view of the front portion of an automobile frame, in outline, with the chassis removed, illustrating my bumper device in operative position;

Figure 2 is a sectional side elevational view of a bumper fastening clip on the line 2—2 of Fig. 1;

Figure 3 is a front elevational view of the bumper centre, illustrating the means employed for hinging the bumper arms thereto;

Figure 4 is a longitudinal sectional view on the line 4—4 of Fig. 5;

Figure 5 is a plan view, enlarged, of the means of connecting a bumper rod and the connecting rod to the steering wheel, and;

Figure 6 is a transverse sectional view of a bumper arm on the line 6—6 of Fig. 1.

Referring now more particularly to the several figures of the drawing wherein like parts are referred to by like reference characters, the numeral 10 designates the front portion of an automobile frame mounted on the conventional front axle 11. Wheels 12 and 13 are mounted on the axle 11 and knuckle joints 14 and 15 are provided on the said axle 11 in the usual manner as illustrated in Fig. 1 of the drawing.

Arms 16—16 extend from said knuckles 14 and 15 and are secured in ball and socket joints 17—17. The terminals of a conventionally horizontally extending connecting rod 18 are likewise secured in said ball and socket joints 17—17.

Duplicate longitudinal bumper rods 21—21, parallel each side of the automobile frame 10, and terminate at their lower ends in integral tangs 22—22. Lever arms 19 and 20 extend from the knuckles 14 and 15, respectively, and the extending ends of said arms are secured in clevises 23 and 24, the slotted ends of said clevises 23—24 receiving the tangs 22—22 of the bumper rods 21—21. Bolts 25—25 secure said tangs 22—22 in the said clevises 23—24, thus operably connecting the bumper rods 21—21 with the axle 11.

The front ends of the bumper rods 21—21 also terminate in integral tangs 26—26, secured in clevises 27—27, similar to clevises 23—24.

The bumper proper comprises two flexible metal springs 28 and 29, spring 28 being bent to form multiple outer loops and spring 29 being bent to form multiple inner loops, the end portions of said springs 28 and 29 overlapping and being secured to the front of the frame 10 in the manner particularly illustrated in Fig. 1 of the drawing, viz, a strap 30 is secured to the front spring 31 and the front portion of the frame 10, on each side of the car. Said straps 30—30 are provided with integral pad eyes 32—32 and clips 33—33 having the slots 34—34 into which the overlapping end portions of the springs 28 and 29 rest, they being secured therein by means of bolts 35—35.

Duplicate transverse bumper arms 36—36 are hinged to the front portion of the spring 29 as at 37—37. Said arms 36—36 are constructed of T iron, as shown particularly in Fig. 6 of the drawing, a portion at the outer ends thereof being cut away and looped under to form wings 38—38.

L shaped levers 39—39 are pivoted in lugs 40—40 on the inner side of the bumper arms 36—36 and the opposite ends of said levers 39—39 are pivotally connected with the inner ends of horizontally extending link rods 41—41 secured in the clevises 27—27.

Radius rods 42—42 are likewise pivoted in the lugs 40—40 and extend at an angle downwardly and impinge against the looped spring 28 at the points 44—44, and like rods 43—43 are pivotally connected with said rods 42—42 at said spring impinging points 44—44 and extend at an angle upwardly and are secured in the clevises 27—27.

A longitudinally extending connecting rod or shaft 45 adapted to be connected with the steering wheel (not shown) is secured at its opposite terminal to the clevis 23 by means of a ball and socket joint 46, as particularly illustrated in Figs. 4 and 5 of the drawing.

As the frame 10 is mounted on the axle 11 and the looped springs 28 and 29 are secured to the said frame 10 and also to the front spring 31 of the car, there must be a certain amount of play to the rods 21—21 to lessen the jar from ruts and minor obstacles encountered by the wheels 12 and 13. I have met this condition by the novel construction and arrangement of the rods 21—21 as hereinabove described.

In application #520,205, herein cited, the connecting rod or shaft 45 is shown as a two part rod provided with compression means to stabilize the steering control.

In operation: The bumper being positioned in place and connected as hereinabove described; when an obstacle is encountered by a hinged bumper arm 36, if the impact be from the front and against the left bumper arm 36, the said bumper arm 36 will impinge against the clevis 27 on the front end of the rod 21 forcing said rod 21 rearwardly actuating the axle knuckle lever 19, causing the left wheel 12 to move to the right and away from the obstacle.

When the impact is against the right hand bumper arm 36, from the front, the same result, as just described, is had with the opposite wheel 13, each arm 36 and its connections being a duplicate of the other.

As the wheels 12 and 13 are connected by the transverse rod 18 the movement of either wheel will cause the opposite wheel to move in the same direction.

The spring loops 28 and 29 will cause the bumper arms 36—36 to return to their normal positions after the obstacle has been passed and will cushion the force of the impact.

It will now be apparent that I have devised a novel and useful construction, the salient features of which combine flexibility with rigidity, which embodies the features of advantage enumerated as desirable in the statement of the invention and the above description, and while I have in the present instance shown and described the preferred embodiment thereof which has been found in practice to give satisfactory and reliable results, it is to be understood that the same is susceptible of modification in various particulars without departing from the spirit and scope of the invention or sacrificing any of its advantages.

Having thus described my invention what I claim as new and desire to secure by Letters Patent is:—

1. A bumper of the class described, comprising looped springs secured to the front portion of an automobile, transverse bumper arms hinged to the outer looped spring, centrally thereof, longitudinally extending rods adapted to be actuated by said bumper arms, levers connecting said rods at their inner terminals with the knuckle joints on the front axle of said automobile and a rod connecting said knuckle joints, substantially as decsribed.

2. A bumper of the class described, comprising looped springs secured to the front portion of an automobile, transverse bumper arms hinged to the outer looped spring, centrally thereof, longitudinally extending rods adapted to be actuated by said bumper arms, levers connecting said rods at their inner terminals with the knuckle joints on the front axle of said automobile, and a rod connecting said knuckle joints, said bumper arms being looped at their outer terminals, substantially as described.

3. A bumper of the class described, comprising looped springs secured to the front portion of an automobile, transverse bumper arms hinged to the outer looped spring, centrally thereof, longitudinally extending arms terminating in tangs at their inner and outer terminals, clevises in which said tangs are secured, said bumper arms being adapted to impinge against the outer clevises to actuate said rods, levers connecting the inner clevises with the knuckle joints on the front axle of said automobile and a rod connecting said knuckle joints, substantially as described.

4. A bumper of the class described, comprising looped inner and outer springs, the ends of said springs overlapping, means to secure the said overlapping ends of said springs to the front portion of an automobile, transverse bumper arms hinged to the outer looped spring, centrally thereof, longitudinally extending rods adapted to be actuated by said bumper arms, levers connecting said rods at their inner terminals with the knuckle joints on the front axle of said automobile and a rod connecting said knuckle joints, substantially as described.

In testimony whereof I affix my signature.

PHILIP A. WEIGEL.